United States Patent
Fuchs et al.

(10) Patent No.: US 12,466,904 B2
(45) Date of Patent: Nov. 11, 2025

(54) REDUCTION IN VOC AND FOG VALUES OF FILLED HETEROPHASIC POLYPROPYLENE BY SEPARATE AERATION OF INDIVIDUAL POLYOLEFIN COMPONENTS

(71) Applicant: BOREALIS AG, Vienna (AT)

(72) Inventors: Andreas Fuchs, Linz (AT); Luca Boragno, Linz (AT); Klaus Bernreitner, Linz (AT); Markus Gahleitner, Linz (AT); Jürgen Huber, Linz (AT); Stefanie Engleder, Linz (AT)

(73) Assignee: BOREALIS AG, Vienna (AT)

( * ) Notice: Subject to any disclaimer, the term of this patent is extended or adjusted under 35 U.S.C. 154(b) by 929 days.

(21) Appl. No.: 17/637,025

(22) PCT Filed: Aug. 12, 2020

(86) PCT No.: PCT/EP2020/072629
§ 371 (c)(1),
(2) Date: Feb. 21, 2022

(87) PCT Pub. No.: WO2021/037565
PCT Pub. Date: Mar. 4, 2021

(65) Prior Publication Data
US 2024/0425619 A1  Dec. 26, 2024

(30) Foreign Application Priority Data
Aug. 30, 2019 (EP) .................................. 19194717

(51) Int. Cl.
*C08F 6/00* (2006.01)
*B29C 48/36* (2019.01)
(Continued)

(52) U.S. Cl.
CPC .............. *C08F 6/005* (2013.01); *B29C 48/36* (2019.02); *C08K 3/34* (2013.01); *C08L 23/12* (2013.01);
(Continued)

(58) Field of Classification Search
CPC ........... C08F 6/005; C08L 23/12; C08L 23/14
See application file for complete search history.

(56) References Cited

U.S. PATENT DOCUMENTS 4,332,933 A * 6/1982 Di Drusco ................ C08F 6/02
528/499
6,218,504 B1   4/2001 Dolle et al.
(Continued)

FOREIGN PATENT DOCUMENTS

| CN | 110072898 A | 7/2019 |
| DE | 1272778 | 7/1968 |

(Continued)

OTHER PUBLICATIONS

Chinese Office Action dated Mar. 2, 2023.
(Continued)

*Primary Examiner* — Marc S Zimmer
*Assistant Examiner* — Surbhi M Du
(74) *Attorney, Agent, or Firm* — Tarolli, Sundheim, Covell & Tummino LLP (57) ABSTRACT

A process for reducing the volatile and semi-volatile organic content (VOC and FOG values) of a heterophasic polypropylene composition, the heterophasic polypropylene composition comprising (i) at least 15 wt.-% of at least a first heterophasic polypropylene; (ii) less than 15 wt.-% of at least one elastomeric polyolefin, (iii) at least one filler; (iv) optionally polyethylene; and (v) optionally further polyolefins to below 100 µg/g (VOC, VDA 278 October 2011) and below 390 µg/g (FOG, VDA 278 October 2011), the process (Continued)

involving aerating the first heterophasic polypropylene and each further polyolefin component that is present in an amount of at least 15 wt.-% relative to the total weight of the heterophasic polypropylene composition, before extruding these aerated components with the at least one elastomeric polyolefin and the at least one filler and the optional polyethylene and/or optional further polyolefin(s).

12 Claims, 1 Drawing Sheet (51) Int. Cl.
  *B29K 23/00* (2006.01)
  *B29K 63/00* (2006.01)
  *C08J 3/00* (2006.01)
  *C08K 3/34* (2006.01)
  *C08L 23/12* (2006.01)

(52) U.S. Cl.
  CPC .... *B29K 2023/065* (2013.01); *B29K 2023/12* (2013.01); *B29K 2023/16* (2013.01); *B29K 2063/00* (2013.01); *C08J 3/005* (2013.01); *C08J 2323/14* (2013.01); *C08J 2423/06* (2013.01); *C08J 2423/08* (2013.01); *C08J 2423/12* (2013.01); *C08L 2205/035* (2013.01); *C08L 2207/02* (2013.01)

(56) References Cited

U.S. PATENT DOCUMENTS

| | | | | |
|---|---|---|---|---|
| 7,232,878 B2* | 6/2007 | Mulgrew | .................. | B29B 7/82 |
| | | | | 203/19 |
| 2006/0217528 A1* | 9/2006 | Cousin | ...................... | B29B 9/16 |
| | | | | 528/480 |
| 2018/0200921 A1* | 7/2018 | Grein | ....................... | B29B 9/12 |

FOREIGN PATENT DOCUMENTS

| | | | |
|---|---|---|---|
| EP | 0737712 A2 | 3/1998 | |
| EP | 1498255 A1 | 1/2005 | |
| EP | 1671773 A1 | 6/2006 | |
| EP | 2154190 A1 | 2/2010 | |
| EP | 2262858 B1 | 2/2013 | |
| EP | 2470600 B1 | 7/2013 | |
| EP | 3124537 A1 | 2/2017 | |
| EP | 3260489 B1 | 12/2019 | |
| RU | 2482141 C2 | 5/2013 | |
| RU | 2496807 C2 | 10/2013 | |
| WO | 2002088194 A1 | 11/2002 | |
| WO | 2008/046139 A1 | 4/2008 | |
| WO | WO-2017220556 A1 * | 12/2017 | .............. C08F 2/001 |
| WO | 2018/114071 A1 | 6/2018 | |

OTHER PUBLICATIONS

Applicant: Borealis AG, AT; "Reduction in VOC and FOG Values of Filled Heterophasic Polypropylene by Separate Aeration of Individual Components"; Russian Application No. 2022107832/04 Filed: Aug. 12, 2020; Russian Search Report; 4 pgs.
Applicant: Borealis AG, AT; Russian Application No. 2022107832/04 Filed: Aug. 12, 2020; Russian Office Action dated Nov. 1, 2022; 4 pgs.
Applicant: Borealis AG; European Application No. EP19194717; "Reduction in VOC and FOG Values of Filled Heterophasic Polypropylene by Separate Aeration of Individual Components"; European Extended Search Report dated Feb. 14, 2020; 10 pgs.
Applicant: Borealis AG; European Application No. EP19194717; "Reduction in VOC and FOG Values of Filled Heterophasic Polypropylene by Separate Aeration of Individual Components"; International Application No. PCT/EP2020072629 Filed Aug. 12, 2020; PCT International Search Report and Written Opinion dated Nov. 27, 2020; 14 pgs.

* cited by examiner

REDUCTION IN VOC AND FOG VALUES OF FILLED HETEROPHASIC POLYPROPYLENE BY SEPARATE AERATION OF INDIVIDUAL POLYOLEFIN COMPONENTS

FIELD OF THE INVENTION

The present invention relates to a process for obtaining filled heterophasic polypropylene compositions with low volatile organic compound and low semi-volatile condensable substance contents determined as VOC content and FOG content according to VDA 278 October 2011 (VDA=Verband der Automobilindustrie).

BACKGROUND

Olefin polymers resulting from solution or bulk polymerisation often contain traces of the medium in which the polymerisation reaction has been carried out, as well as low molecular weight by-products of the polymerisation process. Various options for the removal of volatile (VOC, VDA 278 October 2011) and semi-volatile organic condensables (FOG, VDA 278 October 2011) from olefin polymers are known. These include the use of solvents such as water, the use of vapour as well as the use of elevated temperature streams of gas in a process referred to as aeration or purging. Examples of general methods of aeration can be found in GB 1272778, WO 02/088194, WO2004/039848 and U.S. Pat. No. 6,218,504. These documents particularly relate to aeration or purging of polyethylene compositions.

The development of aeration processes is challenging, as olefin polymers have an intrinsic stickiness and a tendency to agglomerate above a relatively low temperature. This results in a limited temperature window in which aeration can be carried out. Polyolefins obtained from solution or bulk polymerisation processes often have a high content of volatiles (VOCs, VDA 278). In situations where it is also important to remove semi-volatile organic compounds (FOGs, VDA 278), often longer aeration times are required, as these molecules are by definition less volatile and harder to remove. However, in order to ensure that the polyolefin composition retains its desirable properties such as e.g. mechanical properties and scratch resistance it is important not to remove or strip out the additives required for producing a material with these properties.

Polyolefin compositions, such as e.g. polypropylene compositions, exhibiting a low level of emissions in standard tests like VDA 277 and VDA 278 can be roughly separated into two categories:
- polyolefins deriving their low emission level from the polymerisation process, mostly from the nature of the catalyst, but also from the purity of the applied monomers and possibly from the selection of additives.
- polyolefins and polyolefin compositions having undergone a post-purification step during or after compounding, possibly involving the use of specific substances like carrier liquids or absorbers.

For automotive applications, due to ever-more demanding weight requirements, there is an increasing trend for thin-walled plastic parts. In order to manufacture such thin-walled parts through injection moulding it is required that the constituent polymer resins have sufficiently low viscosity so that the molten resins can readily flow and uniformly fill mould cavities without excessive injection pressures. Decreasing the melt viscosity of a polymer resin requires decreasing the molecular weight of the constituent polymer molecules forming the resin. However, producing polymer resins containing lower molecular weight molecules increases the volatile organic compound (VOC, VDA 278 October 2011) and semi-volatile organic condensables (FOG, VDA 278 October 2011) content in the resin.

Tailored catalyst systems can be employed in order to synthesise polyolefins having intrinsically lower FOG and VOC content, although by limiting the catalyst choice, the ability to suitably tailor the other properties of the polyolefin is restricted.

Another common approach for reducing the occurrence of measurable VOC and FOG content is the use of additives that predominantly act to adsorb the compounds, thus reducing their volatility.

Strategies involving specific catalysts or additives are disclosed in EP 2154190, EP 0737712, EP 2262858, EP 1498255, EP 2470600, and EP 3260489.

Degassing of polyolefin particles is a further well-known strategy for reducing the volatile content thereof.

EP 3126408 discloses a method of producing rheologically modified polypropylene in which post-reactor treatment is used to reduce the FOG and VOC content. Said post-reactor treatment firstly involves a visbreaking step, followed by maintaining the visbroken polypropylene at 105° C. for a period of at least 48 hours under a flow of purging gas. No information on VOC values is disclosed, just levels for FOG and peroxide residues are given.

WO 2014/090856 describes a method of producing particles with low volatile content, in which the polymer particles are degassed using a flow of nitrogen gas. This degassing step occurs directly on the particles exiting the reactor, prior to pelletisation. Since the size of reactor polymer particles is quite widely distributed, it is not difficult to envisage that the degassing of these particles carries the risk of particle entrainment, and therefore the degassing conditions used must be carefully selected. No information on VOC and FOG values is disclosed.

EP 1671773 discloses a method for degassing polyethylene pellets suitable for preparing pipes. Said method involves using specific cooling systems for more effective heat transfer between the different stages of the degassing process, resulting in a quicker, more energy efficient process. There is limited information provided on the form of the degassing silo, and the effect of the process on FOG and VOC content specifically is not discussed.

In each of the above examples, the simple polymer pellets (or particles) are provided, which, following degassing, can then be directly used for the production of articles. The degassing of more complex polymer systems, and the potential problems that could be encountered are not envisaged.

As discussed above and in the cited prior art documents, suitable conditions for the aeration of polymer pellets are restricted by the tendency of the pellets to become sticky and agglomerate. This is particularly the case for polymer compositions that contain low melting point elastomers, such as heterophasic compositions.

Furthermore, more complicated compositions, which include multiple polymers produced in separate polymerisations, also invariably contain a number of common additives, for example, fillers, pigments, nucleating agents, antioxidants, stabilisers, slip agents and so on. In some cases, these additives can themselves be volatile, and therefore care must be taken during the compounding step that sufficient additives are used that an aeration process will not deplete the additives too significantly.

Finally, it is trivial to see that not all components of a complex polymer composition will need to be aerated.

Aeration of the complex compounded compositions, currently the standard method in the art, could therefore be improved upon.

The present invention is based on the findings that by aerating only certain components of a complex composition, a more efficient degassing can be achieved. Whilst the fact that less degassing results in a faster process is to be expected, it is an unexpected effect that the efficiency of the reduction of VOC and FOG values is not significantly reduced in line with the reduced degassing. In particular, noticeable efficiency improvements can be made when considering filled heterophasic compositions.

When maximum reduction of VOC and FOG content is desired, the filled heterophasic polypropylene composition as a whole can be subjected to an aeration process. However, such a process is relatively expensive due to limited space-time-yield. In a first aspect, filler reduces the available space. In a second aspect, added elastomeric components usually require the use of relatively low temperatures again limiting space-time-yield.

SUMMARY OF THE INVENTION

The present invention is based on the finding that the reduction of volatile and semi-volatile organic content (VOC and FOG values) for complicated polymer blends may be more efficiently achieved through the selective aeration of certain polymer components, whilst other components do not need to be aerated for the final blended composition to achieve desirable overall VOC and FOG values.

The present invention insofar provides a process for reducing the volatile and semi-volatile organic content (VOC and FOG values) of a heterophasic polypropylene composition, the heterophasic polypropylene composition comprising
 (i) at least 15 wt.-% of at least a first heterophasic polypropylene;
 (ii) less than 15 wt.-% of at least one elastomeric polyolefin,
 (iii) at least one filler;
 (iv) optionally polyethylene; and
 (v) optionally further polyolefins
to below 100 µg/g (VOC, VDA 278 October 2011) and below 390 µg/g (FOG, VDA 278 October 2011),
the process comprising the steps of
 a) aerating the first heterophasic polypropylene through steps a1) to a5) wherein the polyolefin of said steps is the first heterophasic polypropylene:
  a1) providing an aeration vessel having
   at least one inlet for aeration gas,
   at least one outlet for exhaust gas,
   an inlet for a polyolefin at the top of the aeration vessel,
   an outlet for the polyolefin at the bottom of the aeration vessel;
   wherein the polyolefin is present as a packed bed;
  a2) initiating a counter-current flow of the polyolefin and aeration gas
  a3) by
   feeding the raw polyolefin showing a VOC value of greater than 100 µg/g and an FOG value of greater than 390 µg/g (VOC and FOG values according to VDA 278 October 2011), into said aeration vessel from the top
   feeding the aeration gas into said aeration vessel via the at least one inlet at the bottom;
   withdrawing the exhaust gas via the outlet for exhaust gas;
  a4) maintaining said aeration gas flow for an aeration time of less than 24 hours;
  a5) withdrawing the aerated polyolefin having a VOC value of below 100 µg/g and an FOG value of below 390 µg/g (VOC and FOG values according to VDA 278 October 2011) via the outlet at the bottom of the aeration vessel;
 b) repeating steps a1) to a5) for the respective aeration of each further polyolefin component that is present in an amount of at least 15 wt.-% relative to the total weight of the heterophasic polypropylene composition, such that all polyolefin components which are individually present in an amount of at least 15 wt.-% relative to the total weight of the heterophasic polypropylene composition are aerated;
 c) extruding the withdrawn first heterophasic polypropylene and any further aerated polyolefin components with the at least one elastomeric polyolefin and the at least one filler and the optional polyethylene and/or optional further polyolefin(s) if present to afford the heterophasic polypropylene composition having a VOC value below 100 µg/g (VDA 278 October 2011) and a FOG value below 390 µg/g (VDA 278 October 2011).

The invention is further directed to a product obtainable by the process of the invention, preferably an article, more preferably an automotive interior article.

The term "composition" may refer to both homopolymers and copolymers, which may optionally contain further components and/or additives.

In the present invention the term "polypropylene" encompasses propylene homopolymers and/or propylene copolymers.

The term "volatile organic compound content" or "VOC content" refers to the toluene equivalent content in a sample emission of material determined according to the Verband der Automobilindustrie recommendation VDA 278 October 2011. Volatile organic compound content is a measure of emissions from plastic materials such as low-density plastomers, which are caused by low-molecular components in the polymer material, generally alkanes with carbon chain lengths of up to $C_{20}$. These low-molecular components can be residual monomers, oligomers, additives, plasticizers and/or degradation products.

The term "semi-volatile organic condensables content" (FOG content) refers to the n-hexadecane equivalent content in a sample emission of material determined according to the Verband der Automobilindustrie recommendation VDA 278 October 2011. Semi-volatile organic compound content is a measure of emissions from plastic materials, which are caused by medium molecular weight components, such as oligomers, which have a boiling point in the boiling range of the $C_{16}$-$C_{32}$ alkanes.

The term "raw" refers to polyolefins or polyolefin compositions that have not undergone, or are yet to undergo an aeration process, in contrast to the aerated polyolefin components of the invention.

The term "aeration" or "aeration process" as used herein denotes a process or process step, in which a compound is subjected to a gas flow. This process is carried out in an aeration vessel.

The term "aeration gas" such as used herein denotes any gas suitable for being heated up to at least 50° C. and suitable for removing volatile organic compounds (VOCs) and semi-volatile organic condensables (FOGs) from polyolefin compositions. Suitable gases are, for example, nitrogen, or air, or mixtures thereof. However, in principle any inert gas may be used. For economic reasons, the most preferred gas for the process of the present invention is air.

The gas, which leaves the aeration vessel, i.e. the gas that has taken up the volatile organic compounds (VOCs) and semi-volatile organic condensables (FOGs), is denoted as the exhaust gas herein.

Percentage reduction in VOC values (i.e. VOC content) according to the present invention is calculated as:

Percentage reduction in VOC values =

$$\left(\frac{VOC \text{ value before aeration} - VOC \text{ value after aeration}}{VOC \text{ value before aeration}}\right) \times 100$$

Percentage reduction in FOG values (i.e. FOG content) according to the present invention is calculated as:

Percentage reduction in FOG values =

$$\left(\frac{FOG \text{ value before aeration} - FOG \text{ value after aeration}}{FOG \text{ value before aeration}}\right) \times 100$$

In the process according to the present invention it is preferred that the at least one elastomeric polyolefin and the at least one filler are not aerated.

The present invention furthermore preferably provides an aeration process, in which the combined heterophasic polypropylene and any further aerated polyolefin components make up 50 to 90 wt.-% of the heterophasic polypropylene composition.

In the process according to the present invention, the raw first heterophasic polypropylene and any further polyolefin components to be aerated, which are flowed into the aeration vessel, are preferably provided in pellet form. Preferred pellet diameters, more precisely median particle size d50 as measured according to ISO 3310 and determined by ISO 9276-2 are from 2.5 to 5.0 mm, preferably 2.5 to 4.5 mm, most preferably 2.8 to 4.0 mm.

Pellets (or granules) often show a considerable gradient as to the amount of volatiles. As expected, in conventionally produced polyolefin composition pellets, the amount of volatiles (VOCs) and semi-volatiles (FOGs) is essentially zero close to the surface; whereas, it is considerably higher further from the surface of the pellet.

In the process according to the current invention, the pellets are optionally pre-heated before being added to the aeration vessel, such as being pre-heated to 40° C. before being added to the aeration vessel.

The present invention provides an aeration process, which is operated for less than 24 hours, preferably less than 12 hours, or less than 10 hours, such as from 3 to 9 hours.

The present invention preferably provides a process, wherein the temperature of the aeration gas is at least 100° C., or at least 110° C., or at least 115° C. The temperature may be from 100° C. to 140° C., or from 110° C. to 135° C., or from 115° C. to 130° C. The aeration temperature is most preferably 120° C. It is believed that the process according to this invention when carried out at 120° C. leads to a heterophasic polypropylene composition that maintains the scratch resistance exhibited prior to the a heterophasic polypropylene composition that has not undergone the process of the invention. Moreover, it is believed that at these high temperatures most polymers would melt, or alternatively be too sticky to handle easily; consequently, the present process in combination with specific polymers provides advantages of efficiency of the process, while still ensuring that the heterophasic polypropylene composition can be easily handled.

The present invention optionally provides a process in which the exhaust gas is subjected to a purification step and recycled back to the inlet for the aeration gas.

The present invention optionally provides a process, wherein the exhaust gas passes a heat exchanger before being discharged into the atmosphere.

The present invention preferably provides a process, wherein the aeration vessel is a silo, preferentially an insulated silo. It should be understood that the use of an insulated silo is preferred for all embodiments described herein. The present invention preferably provides a process, wherein the aeration vessel is cylindrical, or a cylinder with a conical base.

DETAILED DESCRIPTION OF THE INVENTION

The Process

Figure 1:
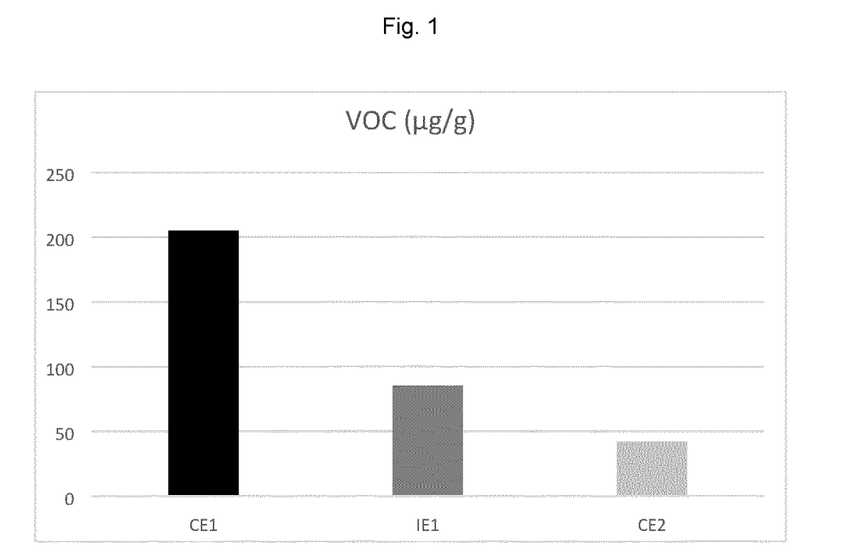
FIG. 1 shows the VOC content of the inventive and comparative examples
Figure 2:
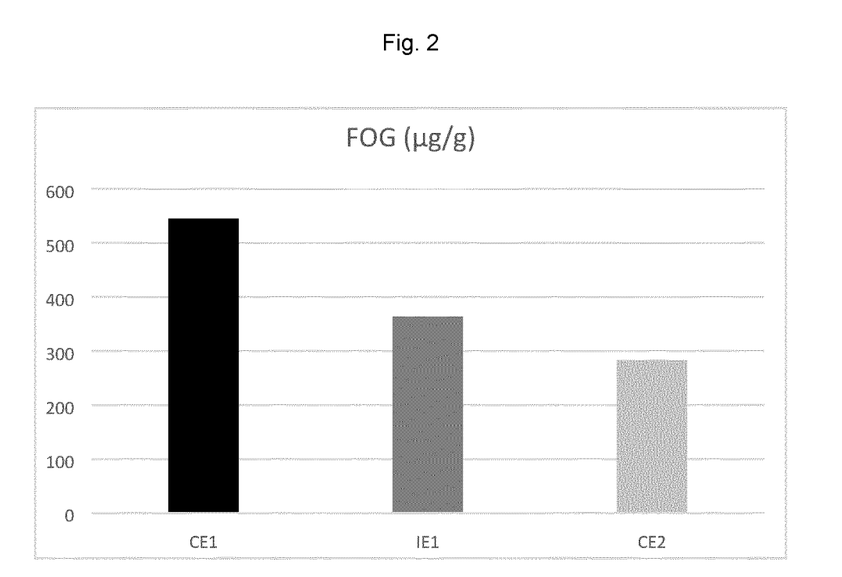
FIG. 2 shows the FOG content of the inventive and comparative examples

The invention is primarily concerned with a process for reducing the volatile and semi-volatile organic content (VOC and FOG values) of a heterophasic polypropylene composition, the heterophasic polypropylene composition comprising (i) at least 15 wt.-% of at least a first heterophasic polypropylene;
(ii) less than 15 wt.-% of at least one elastomeric polyolefin,
(iii) at least one filler;
(iv) optionally polyethylene; and
(v) optionally further polyolefins to below 100 µg/g (VOC, VDA 278 October 2011) and below 390 µg/g (FOG, VDA 278 October 2011), the process comprising the steps of a) aerating the first heterophasic polypropylene through steps a1) to a5) wherein the polyolefin of said steps is the first heterophasic polypropylene:

a1) providing an aeration vessel having
at least one inlet for aeration gas,
at least one outlet for exhaust gas,
an inlet for a polyolefin at the top of the aeration vessel,
an outlet for the polyolefin at the bottom of the aeration vessel;
wherein the polyolefin is present as a packed bed;

a2) initiating a counter-current flow of the polyolefin and aeration gas a3) by
feeding the raw polyolefin showing a VOC value of greater than 100 µg/g and an FOG value of greater than 390 µg/g (VOC and FOG values according to VDA 278 October 2011), into said aeration vessel from the top
feeding the aeration gas into said aeration vessel via the at least one inlet at the bottom;
withdrawing the exhaust gas via the outlet for exhaust gas;

a4) maintaining said aeration gas flow for an aeration time of less than 24 hours;

a5) withdrawing the aerated polyolefin having a VOC value of below 100 µg/g and an FOG value of below 390 µg/g (VOC and FOG values according to VDA 278 October 2011) via the outlet at the bottom of the aeration vessel;

b) repeating steps a1) to a5) for the respective aeration of each further polyolefin component that is present in an amount of at least 15 wt.-% relative to the total weight of the heterophasic polypropylene composition, such that all polyolefin components that are individually present in an amount of at least 15 wt.-% relative to the total weight of the heterophasic polypropylene composition are aerated;

c) extruding the withdrawn first heterophasic polypropylene and any further aerated polyolefin components with the at least one elastomeric polyolefin and the at least one filler and the optional polyethylene and/or optional further polyolefin(s) if present to afford the heterophasic polypropylene composition having a VOC value below 100 µg/g (VDA 278 October 2011) and a FOG value below 390 µg/g (VDA 278 October 2011).

The effect of the invention is a more efficient reduction of VOC and FOG values than would be achieved by aeration of pellets of the final blended heterophasic polypropylene composition.

Whilst it is trivial that a reduction of the mass to be treated will speed up the process, i.e. increase space-time yield, other factors combine to enhance the increase in space-time yield. By selecting only the components that are the chief contributors to the overall FOG and VOC content of the composition, said overall values can be reduced to a satisfactory level without the need for aeration of other components. Whilst the resultant FOG and VOC values of the composition will be higher than in case that every component were aerated, the values are still more than satisfactory for the composition to be used in the manufacture of inter alia automobile articles. The improvement in space-time yield as result of the process outweighs the reduced effect of the degassing.

The improvement in space-time yield has obvious economic advantages, as aeration for relatively short time periods requires less energy to supply heated gas. Additionally, less space is required for silos to house the polymer composition than for longer aeration processes, wherein larger amounts of the polymer composition must be stored for longer periods of time during the aeration process.

The process of the invention as given above defines that each polyolefin fraction which makes up at least 15 wt.-% of the heterophasic polypropylene composition is aerated through steps a1) to a5). Since the at least one elastomeric polyolefin is present in less than 15 wt.-%, this means that both it and the filler (which may be present in at least 15 wt.-% but is not a polyolefin) are not aerated.

It is preferred that the total mass of polyolefins to be aerated is not so high as to minimize the efficiency gains of the process of the invention, but similarly not so low as to mean that the reduction in VOC and FOG values is insufficient for use in, for example, automobile interiors. Suitably the total mass of the compounds to be aerated makes up 50 to 90 wt.-% of the heterophasic polypropylene composition.

Should it be necessary, it is also theoretically possible to further improve the efficiency by tailoring the degassing properties to each individual component, rather than to the most sticky component, as must be done when the composition is aerated as a whole.

In addition, the aeration process of the current invention also has advantages in terms of maintaining the structural properties of the heterophasic polypropylene composition and maintaining the scratch resistance of the polypropylene material while also leading to low levels of VOCs and FOGs. It is believed that aerating for extremely long periods of time with a low temperature gas, or using a gas with a temperature of greater than 140° C. would lead to deterioration of the properties of the polypropylene material, for example deterioration of the scratch resistance properties of the polypropylene.

Furthermore, the process according to the present invention does not lead to a significant loss of "slip-agent" meaning that if the heterophasic polypropylene composition is used for injection moulding to produce polypropylene articles, it is easily released from the mould and no polypropylene is left stuck to the mould surface.

Heterophasic Polypropylene Composition

The heterophasic polypropylene composition of the invention comprises
(i) at least 15 wt.-% of at least a first heterophasic polypropylene;
(ii) less than 15 wt.-% of at least one elastomeric polyolefin,
(iii) at least one filler;
(iv) optionally polyethylene; and
(v) optionally further polyolefins The properties of the first heterophasic polypropylene are not particularly limited.

The $MFR_2$ may for example be from 0.1 to 200 g/10 min, more preferably from 1.0 to 150 g/10 min. The density may be from 850 to 930 g/cm$^3$, more preferably from 860 to 910 g/cm$^3$.

Examples of suitable heterophasic polypropylenes include but are not limited to BG055AI, BF970MO, BJ400HP, ED007HP, EF015AE and EG050AE, commercially available from Borealis AG, Austria. The heterophasic polypropylene may also be a virgin reactor-made heterophasic polypropylene.

The at least one elastomeric polyolefin is similarly not particularly limited.

Suitable elastomeric polyolefins are often copolymers of ethylene with α-olefin comonomers, for example octene.

Examples of suitable elastomeric polyolefins include Engage 7220, Engage 8100, Engage 8200 and Engage 8401 from Dow Chemical, USA, as well as Queo 8201, Queo 8203 and Queo 8210 from Borealis AG, Austria. The at least one elastomeric polyolefin may also be a virgin reactor-made elastomeric polyolefin.

The at least one filler is selected from the group of natural or synthetic non-thermoplastic fillers or reinforcement. Preferably the at least one filler is a mineral filler. It is appreciated that the at least one filler is a phyllosilicate, mica or wollastonite. Even more preferred the at least one filler is selected from the group consisting of mica, wollastonite, kaolinite, smectite, montmorillonite and talc. The most preferred at least one filler is talc.

The optional polyethylene is usually (when present) in the form of a masterbatch formulation for the addition of various additives and stabilizers. The optional additives of the heterophasic polypropylene composition are well-known in the art, and may include (but are not restricted to) the group of antioxidants, pigments, nucleating agents and specific additives for enhancing UV stability and/or scratch resistance. Additives known to improve the scratch resistance of polypropylene compounds include erucamide, stearate and glycerol monostearate amongst others.

The further polyolefins are not limited, and can, for example, be further heterophasic polypropylenes as described above.

The melting temperature (Tm) of the raw first heterophasic polypropylene and all further polyolefin components to be aerated is preferably greater than 150° C., more preferably greater than 160° C. Following aeration there may be a negligible change in the melting point ($T_m$) of the polypropylene composition, such as e.g. a less than 10% reduction in melting point ($T_m$) value, or a less than 5% reduction in melting point value, or a less than 2.5% reduction in melting point value. The melting temperature ($T_m$) of the individual components following aeration are, therefore, each greater than 150° C., preferably greater than 160° C. Without wishing to be bound by any theory, it is believed that the aeration process according to the present invention does not lead to a substantial change in the properties of the individual components, such as e.g. $T_m$, and therefore there would be no substantial change in the properties of the final heterophasic polypropylene composition of the invention relative to an identical heterophasic polypropylene composition in which no individual component has undergone aeration.

The individual aerated components of the heterophasic polypropylene composition of the invention may show FOG values of 500 µg/g or less, preferably 450 µg/g or less, more preferably 400 µg/g or less, and most preferably of 380 µg/g or less. In addition, the individual aerated components that result from the inventive process according to steps a1) to a5) may show VOC values of 150 µg/g or less, preferably of 100 µg/g or less, more preferably of 80 µg/g or less, and most preferably of 60 µg/g or less. (Both VOC and FOG values according to VDA 278 October 2011)

In certain embodiments, the inventive process leads to a reduction in VOC values (VDA 278 October 2011) of the aerated components of the heterophasic polypropylene composition, relative to said aerated components prior to aeration, of greater than 50%, preferably greater than 60%, more preferably of greater than 70%.

In certain embodiments, the inventive process leads to a reduction in FOG values (VDA 289 October 2011) of the aerated components of the heterophasic polypropylene composition, relative to said aerated components prior to aeration, of greater than 10%, preferably greater than 20%, more preferably greater than 30%.

In certain such embodiments, the inventive process leads to a reduction, relative to said aerated components prior to aeration, in VOC values (VDA 278 October 2011) of the aerated components of the polypropylene composition of greater than 50%, and a reduction in FOG values (VDA 278 October 2011) of greater than 10%, more preferably a reduction of greater than 60% and 20% respectively, most preferably a reduction in VOC values (VDA 278 October 2011) of the aerated components of the polypropylene composition of greater than 70%, and a reduction in FOG values (VDA 278 October 2011) of greater than 30%.

The heterophasic polypropylene composition of the invention may show FOG values of 390 µg/g or less, preferably 380 µg/g or less, and most preferably of 370 µg/g or less. In addition, the heterophasic polypropylene compositions that result from the inventive process may show VOC values of 100 µg/g or less, preferably of 90 µg/g or less. (Both VOC and FOG values according to VDA 278 October 2011).

In certain embodiments, the inventive process leads to a reduction in VOC values (VDA 278 October 2011) of the heterophasic polypropylene composition, relative to a comparative heterophasic polypropylene composition in which none of the components have undergone aeration, of greater than 30%, preferably greater than 40%, more preferably of greater than 50%.

In certain embodiments, the inventive process leads to a reduction in FOG values (VDA 289 October 2011) of the heterophasic polypropylene composition, relative to a comparative heterophasic polypropylene composition in which none of the components have undergone aeration, of greater than 10%, preferably greater than 30%, more preferably greater than 20%, most preferably greater than 30%.

In certain such embodiments, the inventive process leads to a reduction, relative to a comparative heterophasic polypropylene composition as described above, in VOC values (VDA 278 October 2011) of the polypropylene composition of greater than 30%, and a reduction in FOG values (VDA 278 October 2011) of greater than 10%, more preferably a reduction of greater than 40% and 20% respectively, most preferably a reduction in VOC values (VDA 278 October 2011) of the polypropylene composition of greater than 50%, and a reduction in FOG values (VDA 278 October 2011) of greater than 30%.

The process according to the present invention, furthermore, does not lead to depletion of "slip agents" such as e.g. erucamide. During polypropylene production, slip agents are often added to the polypropylene blend in order to reduce the coefficient of friction of these polypropylene materials. The most popular slip agents used by industry are from the chemical group of fatty acid amides, such as e.g. erucamide. When a slip agent is mixed with a polypropylene polymer melt, it is absorbed into the amorphous regions of the polypropylene polymer.

Upon cooling, the slip agent becomes incompatible with the polypropylene material because of the different surface energies of the two materials and migrates to the material surface.

The rate of migration depends on the difference between the surface energies of the polypropylene and the slip agent (the larger the difference, the faster the migration). This initially leads to the formation of a monolayer on the polymer surface, followed by the deposition of subsequent layers when new molecules of the slip agent arrive on the surface leading to the formation of a double layer. Because of weak bonding between the layers of fatty acid amides, materials produced from polypropylene containing fatty acid amides will slide over each other with ease. The presence of a layer of slip agent also reduces the friction at the surface of the polypropylene composition. This property is also important, for example, when producing injection-moulded articles, as slip agents can be used to help aid the release of injection-moulded articles from a mould. Fatty acid amides come to the surface of polypropylene articles, when the polypropylene cools; therefore, reducing the coefficient of friction between the polypropylene article and the mould. This means that with relatively little force the polypropylene article can be removed from the mould and that no polypropylene sticks to the mould on release of the moulded article. Many slip agents in particular fatty acid amides, such as e.g. erucamide are relatively volatile and, therefore, care is required to prevent these materials escaping during processing steps in polymer production. The process according to the current invention does not lead to depletion of slip agents in particular fatty acid amides, such as e.g. erucamide. Therefore, the process according to the present invention allows the advantageous removal of volatile and semi-volatile substances, without stripping out slip agents from the polypropylene composition. Thus, in the process according to the present invention, the polypropylene composition preferably contains at least one slip agent, more preferably at least one slip agent selected from the group of fatty acid amides, most preferably erucamide.

Aeration Gas Flow

In the process according to the present invention, the polyolefin, preferably in the form of pellets, is preferably subjected to a warm gas-stream.

The present invention preferably provides a process, wherein the total normalised volumetric airflow used is from 1 to 5 Nm$^3$/kg such as at least about 1.5 Nm$^3$/kg, preferably at least about 2 Nm$^3$/kg, such as around 2.6 Nm$^3$/kg.

According to the present invention, the gas input is at the bottom of the aeration vessel, resulting in a gas flow from bottom to top through the bed of the polyolefin composition. In the present invention, the gas inlet may preferably be selected from the group of: a nozzle, a series of nozzles, a gas distribution ring and a gas distribution plate.

The process according to the present invention comprises a step of optionally subjecting the gas downstream of the aeration vessel to a means for removing the hydrocarbons. Preferably, these means are selected from one or more catalytic oxidation units, one or more carbon absorption columns (drums) and/or any conventional exhaust treatment known in the art. Even more preferably, these means are carbon absorption columns (drums). Preferably, when the aeration gas is air and/or nitrogen, it can be emitted into the atmosphere after removal of hydrocarbons. Additionally, the aeration gas can be treated and re-circulated back into the aeration vessel.

Moreover, the heat still contained in the discharged gas can be transferred to the gas used for aeration via heat exchangers known in the art, if the gas taken from the environment has a temperature lower than the temperature needed for the process.

In the process according to present invention, the exhaust gas is preferably discharged into the atmosphere. Alternatively, but less preferably the exhaust gas is used again after separation of the volatile and semi-volatile substances.

Aeration Process

The present invention preferably provides an aeration process, which is operated for less than 24 hours, preferably less than 12 hours, more preferably less than 10 hours, most preferably from 3 to 9 hours. Generally, the aeration time is inversely proportional to the gas temperature, meaning that a compromise must be reached to avoid the pellets melting and sticking together. Typical values for the temperature and residence time for polypropylene according to EP 1 671 773 A1 are from 80 to 110° C. for a period of from 10 to 50 hours. It is believed that the reduction in VOC values reaches a plateau following extended aeration times of greater than five hours in the conditions described here; in contrast, for FOG values there is a weaker dependence on aeration time in the period from 0 to 5 hours. It is believed that this is due to slow diffusion of higher molecular weight alkanes ($C_{16}$-$C_{32}$), which contribute greatly to FOG values, in contrast to the rapid diffusion of $\leq C_{25}$ which are considered for VOC values.

In the process according to the present invention, the polyolefin is preferably not mixed or moved throughout the treatment by mechanical means. Consequently, during the aeration process the polyolefin composition is effectively stationary (apart from its vertical transit through the aeration vessel). Therefore, the present invention preferably excludes processes where the polymer composition is agitated during aeration; these processes do not fall under the scope of this invention, such as fluidised bed processes. Absence of mechanical mixing and similar measures such as re-filling or the like is particularly advantageous since the creation of fines is avoided. In addition, the filling degree is higher without the need for mechanical stirring or the need to transfer the polyolefin composition into another treatment vessel/silo.

The present invention optionally provides a process, wherein the pellets are pre-heated before being added to the aeration vessel, such as being pre-heated to at least 40° C., more preferably pre-heated to temperatures of from 80° C. to 100° C. before being added to the aeration vessel.

As the specific heat capacity of the polyolefin composition together with the mass of the polyolefin composition is significant compared to the specific heat capacity of the gas together with the mass of the gas, one has to be attentive that the gas stream temperatures are met for the inlet and the outlet of the aeration. Thus, if the polyolefin composition is provided at relatively low temperatures in a silo, a pre-heating step will be necessary. The pre-heating can also naturally be effected by the gas-stream and the temperatures as specified above. However, during such pre-heating the temperature at the outlet will be lower as the heat is transferred to the polyolefin composition.

The polyolefin composition is optionally pre-heated before the start of the aeration time to speed up the process. Generally, any heating measures known in the prior art can be used for pre-heating. The polyolefin composition may be pre-heated to temperatures of 40° C. or more, preferably 50° C. or more.

Pre-heating could also be considered as not letting the pellets cool down, which are produced, extruded and pelletized shortly beforehand. Such pellets normally have a temperature of about 40° C. or higher, preferably 50° C. or higher. Hence, the production process of the polyolefin composition and the process of the current invention can be carried out as an integrated process.

In contrast, the present invention may provide a process in which the polyolefin composition is not pre-heated before being added to the aeration vessel and in which the polyolefin is simply warmed by the flow of heated aeration gas in the silo. Without wishing to be bound by any theory, it is believed that with a rather small pellet size (diameter of ca. 3.5 mm), the composition reaches the desired aeration temperature rapidly after being added to the aeration vessel.

The aeration vessel used in the process of the present invention is not particularly limited and in principle, any commercially available aeration vessel or aeration silo may be used; in addition, customised aeration vessels, which have been specifically constructed for the purpose of aeration, may be used.

For shortening the pre-heating phase, avoiding energy loss during aeration and/or also increased homogeneity over the cross-section, the use of an isolated treatment vessel, preferentially an isolated silo is preferred. The silo may for example be a steel silo. Furthermore, the silo may be cylindrically or conically shaped.

Products and Articles

An aspect of the present invention also relates to products obtainable by the processes described above and to articles produced therewith. Polypropylene is a versatile material that is easily processable and which finds a number of applications in the automobile industry e.g. for injection moulded components such as, e.g., dashboards or car door interior articles. Polypropylene compositions are also used as the covering for blister packaging.

All preferred ranges and embodiments as described above also hold for these products and articles and are incorporated by reference herewith.

Experimental Part

The following Examples are included to demonstrate certain aspects and embodiments of the invention as described in the claims. It should be appreciated by those of skill in the art, however, that the following description is illustrative only and should not be taken in any way as a restriction of the invention.

Test Methods

Sample Preparation

VOC values, FOG values and TVOC values were measured as described below, after sample preparation consisting of injection moulding plaques in the acc. EN ISO 19069-2:2016. These plaques were packed in aluminium-composite foils immediately after production and the foils were sealed.

For the thermodesorption analysis according to VDA 278 (October 2011) the samples were stored uncovered at room temperature (23° C. max.) for 7 days directly before the commencement of the analysis.

Regarding the VDA 277 (January 1995) measurements, no additional uncovered storage or other conditioning took place. Instead, the injection moulded plaques were cut and ground in a Retsch SM-2000 mill.

In both cases (VDA 277 and VDA 278), the production date of the injection moulded plaques, the time when the sample arrived in the lab as well as the analysis date were recorded.

VOC and FOC acc VDA278

VOC Value is determined according to VDA 278 October 2011 from injection moulded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-Pentacosane (C25) to be determined and analyzed."

FOG Value is determined according to VDA 278 October 2011 from injection moulded plaques. According to the VDA 278 October 2011 the FOG value is defined as "the total of substances with low volatility which elute from the retention time of n-Tetradecane (inclusive). It is calculated as hexadecane equivalent. Substances having a boiling point in the boiling range of n-Alkanes "C16" to "C32" are determined and analyzed."

Melt Flow Rate ($MFR_2$)

The melt flow rates were measured with a load of 2.16 kg ($MFR_2$) at 230° C. The melt flow rate is the quantity of polymer in grams which the test apparatus standardized to ISO 1133 extrudes within 10 minutes at a temperature of 230° C. under a load of 2.16 kg.

Xylene Cold Soluble Fraction (XCS wt %)

The xylene cold soluble fraction (XCS) is determined at 23° C. according to ISO 6427.

Polymer-Puncture Plaque-Instrumented

Puncture energy is determined in the instrumented falling weight test according to ISO 6603-2 using injection moulded plaques of 60×60×1 mm and a test speed of 2.2 m/s, clamped, lubricated striker with 20 mm diameter. The reported puncture energy results from an integral of the failure energy curve measured at (60×60×1 mm).

Diameter D

A sieve analysis according to ISO 3310 was performed. The sieve analysis involved a nested column of sieves with wire mesh screen with the following sizes: >20 μm, >32 μm, >63 μm, >100 μm, >125 μm, >160 μm, >200 μm, >250 μm, >315 μm, >400 μm, >500 μm, >710 μm, >1 mm, >1.4 mm, >2 mm, >2.8 mm, >4 mm. The samples were poured into the top sieve which has the largest screen openings. Each lower sieve in the column has smaller openings than the one above (see sizes indicated above). At the base is the receiver. The column was placed in a mechanical shaker. The shaker shook the column. After the shaking was completed the material on each sieve was weighed. The weight of the sample of each sieve was then divided by the total weight to give a percentage retained on each sieve. The particle size distribution and the characteristic median particle size d50 was determined from the results of the sieve analysis according to ISO 9276-2.

EXAMPLES

Resin Composition

The following components were blended to form a filled heterophasic polypropylene composition.

TABLE 1

Filled heterophasic polypropylene composition to be aerated.

| Component | Wt.-% |
| --- | --- |
| HECO 1 | 29.32 |
| HECO 2 | 17.6 |
| HECO 3 | 15.0 |
| EP 1 | 6.0 |
| Talc | 17.0 |
| CB | 4.5 |
| PE | 8.0 |
| PP | 1.2 |
| Epoxy resin | 0.4 |
| Erucamide | 0.23 |
| Nucleating agent NA-21 | 0.2 |
| Cyasorb UV 3808PP5 | 0.2 |
| Irganox 1076 FD | 0.15 |
| Richfos 168 | 0.1 |
| chalk | 0.1 |

HECO 1: Commercial heterophasic propylene copolymer BJ400HP of Borealis AG, Austria, having a melt flow rate $MFR_2$ (230° C.) of 100 g/10 min and a content of xylene cold solubles (XCS) of 14 wt.-%.
HECO 2: Commercial heterophasic propylene copolymer EF015AE of Borealis AG, Austria, having a melt flow rate $MFR_2$ (230° C.) of 18 g/10 min and a content of xylene cold solubles (XCS) of 31 wt.-%.
HECO 3: Commercial heterophasic propylene copolymer ED007HP of Borealis AG, Austria, having a melt flow rate $MFR_2$ (230° C.) of 7 g/10 min and a content of xylene cold solubles (XCS) of 25 wt.-%.
EP: Commercial elastomeric ethylene-octene copolymer Engage 8200 of Dow Chemical, USA having a melt flow rate $MFR_2$ (190° C.) of 5 g/10 min and a density of 870 kg/m³.
Talc: Commercial talc Jetfine 3 CA of Imerys, UK.
PE: Commercial high-density polyethylene BorPure ™ MB7541 of Borealis having a melt flow rate $MFR_2$ (190° C.) or 4 g/10 min and a density of 954 kg/m³.
PP: Commercial propylene homopolymer HA001A-B1 of Borealis having a melt flow rate $MFR_2$ (230° C.) of 0.6 g/10 min.
Epoxy resin: Commercial bisphenol-based medium molecular weight solid epoxy resin NPES-902 of Nan Ya Plastics Corporation, Taiwan.

Compounding was performed in a Coperion W&P ZSK40 twin screw extruder in a temperature range of 220-240° C. followed by solidification of the resulting melt strand in a water bath and pelletization.

Comparative Example 1 (CE1)

CE1 represents the resin composition as described above, in which neither the individual components nor the final composition have been subjected to aeration.

Comparative Example 2 (CE2)

CE2 represents the resin composition as described above, in which the final composition has been subjected to aeration subsequent to compounding.

Aeration was carried out in an insulated cylindrically shaped silo with dimensions of 1.5 m³. The pellets had a median particle size d50 of 3.5 mm (ISO 3310, evaluation according to ISO 9276-2).

The pellets were at room temperature (ca. 25° C.) before being subjected to aeration i.e. a pre-heating step was not applied.

The aeration process was carried out for 7 hours at a temperature of 140° C. A gas flow rate of 260 m³/h was used. This corresponds to a normalised gas flow of 2.6 Nm³/kg. The pellets were not mixed or agitated during the process and instead simply moved vertically through the silo at a speed of 100 kg/h.

The process was carried out on a 1000 kg scale. In a cylindrical silo of 1.5 m³. A relative flow rate of polypropylene composition pellets of 100 kg/h was maintained throughout the aeration process.

Inventive Example 1 (IE1)

IE1 represents the resin composition as described above, in which HECO 1, HECO 2 and HECO 3 have been subjected to aeration individually prior to the compounding step in which the resin composition as described is blended.

The aeration conditions for the individual components are identical to those described above for CE2.

The VOC and FOG values obtained for HECO 1, HECO 2, HECO 3 and each final composition are given in Table 2. The values in parentheses are the VOC and FOG values for the unaerated individual HECO components.

TABLE 2

Volatile organic and semi-volatile organic condensable contents of the resin components and final composition under differing aeration regimes.

| Example | VOC (µg/g) | FOG (µg/g) | % reduction of VOC | % reduction of FOG |
|---|---|---|---|---|
| HECO 1 | 48 (197) | 369 (630) | 76% | 41% |
| HECO 2 | 56 (196) | 377 (632) | 71% | 40% |
| HECO 3 | 32 (131) | 274 (394) | 76% | 30% |
| CE1 | 205 | 545 | — | — |
| CE2 | 42 | 283 | 80% | 48% |
| IE1 | 85 | 363 | 59% | 33% |

As can be seen from the data in Table 2, whilst the reduction of VOC and FOG values is higher for CE2 than for IE1, the efficiency (i.e. space-time yield) of IE1 is improved. In the process of IE1 only approx. 62% of the composition has been aerated, whilst the reduction of VOC content is 73.6% as high as for CE2 (i.e. 59%/80%) and the reduction of the FOC content is 69.5% as effective.

As discussed previously, this improved space-time yield has obvious economic advantages, as aeration for relatively short time periods requires less energy to supply heated gas. Additionally, less space is required for silos to house the polymer composition than for longer aeration processes, wherein larger amounts of the polymer composition must be stored for longer periods of time during the aeration process.

Further improvements could be envisaged if the aeration of each individual component were optimized separately, rather than general conditions used for each resin.

The invention claimed is:

1. A process for reducing the volatile and semi-volatile organic content (VOC and FOG values) of a heterophasic polypropylene composition, the heterophasic polypropylene composition comprising:
   i) at least 15 wt. % of at least a first heterophasic polypropylene;
   ii) less than 15 wt. % of at least one elastomeric polyolefin;
   iii) at least one filler;
   iv) optionally polyethylene; and
   v) optionally further polyolefins
   to below 100 µg/g (VOC, VDA 278 October 2011) and below 390 µg/g (FOG, VDA 278 October 2011),
   the process comprising the steps of:
   a) aerating the first heterophasic polypropylene through steps a1) to a5) as a substrate:
   a1) providing an aeration vessel having
   at least one inlet for aeration gas,
   at least one outlet for exhaust gas,
   an inlet for the substrate at the top of the aeration vessel,
   an outlet for the substrate at the bottom of the aeration vessel;
   wherein the substrate is present as a packed bed;
   a2) initiating a counter-current flow of the substrate and aeration gas
   a3) by;
   feeding a substrate showing a VOC value of greater than 100 µg/g and an FOG value of greater than 390 µg/g (VOC and FOG values according to VDA 278 October 2011), into said aeration vessel from the top,
   feeding the aeration gas into said aeration vessel via the at least one inlet at the bottom;
   withdrawing the exhaust gas via the outlet for exhaust gas;
   a4) maintaining said aeration gas flow for an aeration time of less than 12 hours;
   a5) withdrawing an aerated substrate having a VOC value of below 100 µg/g and an FOG value of below 390 µg/g (VOC and FOG values according to VDA 278 October 2011) via the outlet at the bottom of the aeration vessel;
   b) repeating steps a1) to a5) for the respective aeration of each further substrate that is present in an amount of at least 15 wt. % relative to the total weight of the heterophasic polypropylene composition, such that all substrates which are individually present in an amount of at least 15 wt. % relative to the total weight of the heterophasic polypropylene composition are aerated;
   c) extruding the withdrawn first heterophasic polypropylene and any further aerated substrates with the at least one elastomeric polyolefin and the at least one filler and the optional polyethylene and/or optional further polyolefin(s) if present to afford the heterophasic polypropylene composition having a VOC value below 100 µg/g (VDA 278 October 2011) and a FOG value below 390 µg/g (VDA 278 October 2011), wherein the at least one elastomeric polyolefin and the at least one filler are not aerated.

2. The process according to claim 1, wherein the combined first heterophasic polypropylene and any further aerated polyolefin components make up 50 to 90 wt. % of the heterophasic polypropylene composition.

3. The process according to claim 1, wherein the aeration gas is air.

4. The process according to claim 1, wherein the process is continuous.

5. The process according to claim 1, wherein the raw first heterophasic polypropylene and any further polyolefin components to be aerated are provided in pellet form, and the pellets have a diameter D in the range of 2.5 mm up to 5 mm.

6. The process according to claim 4, wherein the pellets are pre-heated before being added to the aeration vessel.

7. The process according to claim 1, wherein the temperature of the aeration gas is from 100° C. to 140° C.

8. The process according to claim 1, whereby the exhaust gas is subjected to a purification step and then recycled back into the inlet for the aeration gas.

9. The process according to claim 1, wherein the exhaust gas optionally passes a heat exchanger before being discharged into the atmosphere.

10. The process according to claim 1, wherein the aeration vessel is cylindrical, or conical, or cylindrical with a cone shaped bottom portion.

11. The process according to claim 1, wherein the heterophasic polypropylene composition comprises in addition to components (i) to (v) at least one slip agent as component (vi).

12. The process according to claim 1, wherein the heterophasic polypropylene composition comprises in addition to components (i) to (v) at least one slip agent as component (vi), and wherein the slip agent is selected from the group of fatty acid amides.

\* \* \* \* \*